(12) United States Patent
Hedegaard

(10) Patent No.: US 8,419,942 B2
(45) Date of Patent: Apr. 16, 2013

(54) UNIT, A PLANT AND A METHOD FOR TREATMENT OF POLLUTED WATER

(75) Inventor: Henrik U. Hedegaard, Fakse (DK)

(73) Assignee: Biokube International A/S, Tappernoje (DK)

( * ) Notice: Subject to any disclaimer, the term of this patent is extended or adjusted under 35 U.S.C. 154(b) by 326 days.

(21) Appl. No.: 12/452,228

(22) PCT Filed: Jun. 20, 2008

(86) PCT No.: PCT/EP2008/057851
§ 371 (c)(1),
(2), (4) Date: Apr. 19, 2010

(87) PCT Pub. No.: WO2008/155407
PCT Pub. Date: Dec. 24, 2008

(65) Prior Publication Data
US 2010/0230349 A1    Sep. 16, 2010

(30) Foreign Application Priority Data
Jun. 21, 2007  (DK) .................................. 2007 00892

(51) Int. Cl.
*C02F 3/06* (2006.01)
(52) U.S. Cl.
USPC .......................................... 210/615; 210/151
(58) Field of Classification Search .................. 210/615, 210/617, 150, 151
See application file for complete search history.

(56) References Cited

U.S. PATENT DOCUMENTS

| | | | | |
|---|---|---|---|---|
| 4,680,111 A | * | 7/1987 | Ueda | 210/150 |
| 4,810,377 A | * | 3/1989 | Kato et al. | 210/150 |
| 5,062,958 A | * | 11/1991 | Bateson et al. | 210/615 |
| 5,707,513 A | | 1/1998 | Jowett et al. | |
| 5,750,041 A | * | 5/1998 | Hirane | 210/151 |
| 6,217,761 B1 | | 4/2001 | Catanzaro et al. | |
| 6,682,653 B2 | * | 1/2004 | Chuang et al. | 210/150 |
| 6,793,810 B1 | * | 9/2004 | Takahashi | 210/150 |
| 6,942,788 B1 | * | 9/2005 | Cox et al. | 210/151 |
| 2001/0045392 A1 | * | 11/2001 | Gray et al. | 210/151 |
| 2003/0132148 A1 | | 7/2003 | Okamoto et al. | |
| 2004/0173524 A1 | | 9/2004 | Hedegaard | |
| 2007/0108124 A1 | | 5/2007 | Hedegaard | |

FOREIGN PATENT DOCUMENTS

| | | |
|---|---|---|
| CN | 2338337 | 9/1999 |
| CN | 1807280 | 7/2006 |
| DE | 199 45 985 | 3/2001 |
| EP | 1 484 287 | 12/2004 |
| GB | 2 355 712 | 5/2001 |
| WO | WO 98/23540 | 6/1998 |
| WO | WO 03/020650 | 3/2003 |
| WO | WO 03/027030 | 4/2003 |
| WO | WO 2005/026064 | 3/2005 |

* cited by examiner

*Primary Examiner* — Christopher Upton
(74) *Attorney, Agent, or Firm* — Jacobson Holman PLLC

(57) ABSTRACT

A unit for performing waste water treatment provides a simple and inexpensive approach to purifying water on a small scale at remote locations.

16 Claims, 2 Drawing Sheets

UNIT, A PLANT AND A METHOD FOR TREATMENT OF POLLUTED WATER

CROSS-REFERENCE TO RELATED APPLICATION

This is a national stage of PCT/EP08/057851 filed Jun. 20, 2008 and published in English, which has a priority of Denmark no. PA 2007 00892 filed Jun. 21, 2007, hereby incorporated by reference.

The present invention relates to a unit, a plant and a method for treatment of polluted water.

BACKGROUND OF THE INVENTION

1. Field of the Invention

During the latest decade there has been an increased focus on the purification of waste water from urban and industrial activity prior to leading it back to nature.

Numerous isolated private housings are still not connected to public sewerage systems and their waste water is therefore not treated in a public purifying plant. Instead these housings have to rely on their individual solutions to the purification issue.

A common solution for one-family houses is in form of a septic tank in which an anaerobic fermentation process at low temperatures purifies the waste water. This process however takes a significant time and the outflow is often discharged to some kind of percolation through the ground, e.g. a seepage pit, or through a drainage tube, e.g. to the nearest lake or stream.

In Denmark alone more than 300.000 housings only rely on a septic tank for waste water treatment.

Recent demands from the authorities force such housings to provide improved purification of their waste water. Among others there are focus on organic compounds, phosphorous compounds and nitrogen containing compounds.

In many areas in which it is not feasible to be connected to a public sewerage system it is an option to provide individual solutions which, however would give rise to provision of a total excess capacity of the plants especially for concentrations of users in a limited geographical area. A simple scaling up in a common plant of would also require installation of an excess capacity of septic tanks in order to meet with the required holding time in the septic tank, in order that the plant can handle peak flows.

Still further, in sparely populated or remote areas the infrastructure is often poorly developed which complicates establishment of local or remote plants due to lack of roads or other means of communication.

2. Description of the Related Art

Various mini purification plants have been proposed, e.g. plants of the kind disclosed in WO 03/020650 (Kongsted Maskinfabrik) or WO 2005/026064 (Biokube). Such plants are delivered in the form of a package solution comprising a tank for containing the functional parts together with an assembly of the functional parts which are then assembled at the site where the plant is to be placed.

WO 98/23540 discloses waste-water treatment system for biological cleaning of waste-water from one or more households, institutions, recreation centres, business premises and the like, and for up to approx. 50 person equivalents (PE), said treatment comprising aeration and biological filtration of the waste-water, nitrification and chemical precipitation of phosphor. The miniature waste-water treatment system is characterized in that the system comprises a container with a solid filter element and a post-clarification zone, the system has elements) to lead air in counterblow in relation to the waste-water, a pump controlled by a level switch is provided in a pump well mounted on the side of the container, a time-controlled pump is arranged to dose waste-water to a precipitation chemical, and the system has elements to lead sludge which, by the aeration and chemical precipitation is deposited in the bottom of the container, to a sedimentation tank which is placed upstream from the system.

The system is rather complicated and demands a constant control and supply of e.g. chemicals and maintenance of pumps not always being available at remote sites. Furthermore, the lowermost part of the container consists of a truncated cone, the smallest diameter of which is disposed at the bottom in the container, concentrating the precipitated sludge in the truncated cone which renders a system exposed for clogging. Still further the system disclosed in WO 98/23540 requires a bottom comprising a fundament with a strong flange which has a greater diameter than the container in order to safeguard the system against buoyancy.

For remote sites, however, the delivery of tanks and assembly of the state of the art is associated with disproportionately high transportation and erection costs. Furthermore, such plants should be simple and require a minimum of control and maintenance.

The present invention offers a simple and reliable solution to these problems.

SUMMARY OF THE INVENTION

The present invention relates to a unit comprising means necessary for performing waste water treatment, said unit comprising a) a housing having walls and a level bottom defining a cylindrical chamber optionally having a top cover, said chamber being provided with at least one inlet for water to be treated and at least one outlet for treated water, said outlet being in the lower part of the cylindrical side walls of the chamber, b) at least one bio filter placed in said chamber, said bio filter having a height shorter than the height of the side walls of the chamber and being positioned in the chamber in such a manner that a sludge collecting chamber having the same cross section as the chamber is formed in the cylindrical chamber below the bio filter, c) at least one air distribution unit placed in said chamber between said bio filter and the bottom of the chamber, said air distributing unit being located so that all air is released below the bio filter, d) at least one connection for connecting the inlet with an inlet conduit, e) at least one connection for connecting the outlet with an outlet conduit, f) at least one connection for a line for feeding compressed air to the air distribution unit, and g) at least one connection for connecting to an external supply of electrical power.

In a second aspect the invention relates to a plant for treating water, said plant comprising a first vessel for accommodating at least one unit according to the invention and further comprising a second vessel for accumulating particulate material from the water to be treated before said water is fed to the unit, said second vessel being provided an inlet for water to be treated and at least one conduit for feeding water from the second vessel to the inlet connector of the unit, at least one conduit for connected to the outlet for carrying treated water, and at least one connector for supplying power to the compressor and/or pump.

In a third aspect the invention relates to a method for treating water comprising the steps:

a) feeding the water to a unit or plant according to the invention at a rate distributing the load on the unit evenly over a 24 hour period and b) feeding power to the compressor for feeding air to the air distribution unit.

BRIEF DESCRIPTION OF THE DRAWINGS

The invention is disclosed more in detail with reference to the drawings in which.

DETAILED DESCRIPTION OF THE PRESENT INVENTION

Figure 3:
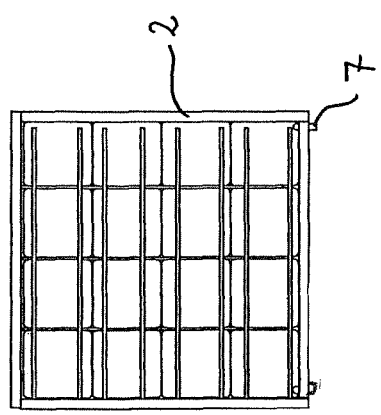
FIG. 3 shows the embodiment of FIG. 1 seen from above.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

The present invention relates to a unit for water treatment, said unit comprising the components necessary for performing waste water treatment, said unit comprising a) a housing having walls and a level bottom defining a cylindrical chamber optionally having a top cover, said chamber being provided with at least one inlet for water to be treated and at least one outlet for treated water, said outlet being in the lower part of the cylindrical side walls of the chamber, b) at least one bio filter placed in said chamber, said bio filter having a height shorter than the height of the side walls of the chamber and being positioned in the chamber in such a manner that a sludge collecting chamber having the same cross section as the chamber is formed in the cylindrical chamber below the bio filter, c) at least one air distribution unit placed in said chamber between said bio filter and the bottom of the chamber, said air distributing unit being located so that all air is released below the bio filter, d) at least one connection for connecting the inlet with an inlet conduit, e) at least one connection for connecting the outlet with an outlet conduit, f) at least one connection for a line for feeding compressed air to the air distribution unit, and g) at least one connection for connecting to an external supply of electrical power.

The present invention further relates to a method for biological purification of polluted water and a plant for use in the method. In particular, a plant according to the invention is a purification plant of the type "submerged aerated bio filter plant", and is characterized in that the plant is capable of handling varying amount of incoming water be by evening out the load on the plant. This is obtained by controlling the flow rate from a vessel or tank for accumulation of particulate material to the unit(s) according to the invention, e.g. using a pump delivering a uniform feeding stream to the unit.

The invention is based on the idea of providing a unit comprising all functional parts needed for the treatment of waste water, which unit is then placed in a tank which may be produced locally from materials being locally available and be provided with a source of electrical power and a source of compressed air.

The functional parts will be manufactured and assembled to a unit according to the invention which is ready to be set up at the desired site in a simple tank with a level bottom and to be connected to a power supply and supply of water to be treated and to conducts for carrying treated water and optionally a compressor unit.

A tank for use together with units according to the invention may in a most simple embodiment be in the form of a pit or niche in the ground provided with a level bottom or a tank erected from concrete or other material being locally available or from prefabricated parts for assembling a tank. Such prefabricated parts are preferably lightweight parts produced locally from materials locally available. The purpose of the tank is to accommodate a unit of the invention and to ensure a constant level of water in a plant comprising such unit, suitably by providing the tank with an overflow pipe. Furthermore, the tank may have a size allowing it to serve as a reservoir for settled sludge for reducing the frequency of removal of sludge and maintenance Thus, no voluminous tank has to be delivered at a remote site and the transport and delivery of the unit which is ready to set up and be connected to the connections needed may be effected using smaller and light trucks or even helicopters.

It has been found that the present invention renders it simple and cheap to establish purification of water in small scale at remote locations, where needed and thus provides a suitable solution to the problem of improving the quality of waste water and to reduce the adverse effects thereof in nature at remote locations where it may be difficult to establish a conventional purification plant.

In a unit according to the invention particles and sludge are simply deposited in the bottom thereof.

In one embodiment the unit is provided with pumping means in the form of an air lift pump for removing deposited matter from the bottom thereof.

Settling is ensured by dimensioning the units with the bio filters in consideration of the amount of water to be treated to obtain a residence time of water in the unit being longer than the time used for a predetermined fraction e.g. $\frac{1}{2}$, $\frac{2}{3}$, $\frac{3}{4}$, $\frac{4}{5}$, $\frac{9}{10}$ or $\frac{99}{100}$ of the solid matter to sink from the top to the bottom of the unit to form a sediment.

In one embodiment of the invention the unit of the invention may e.g. be used as such by placing one or more units forming individual water treatment plants in a lake or stream or fjord or firth for purifying and aerating the water. Air fed to the air distributing unit below the bio filter which ensures circulation of the air and water to be treated through the filter so that contact is established between the water to be treated and the bacteria in the bio film on the filter surfaces whereby organic matter is decomposed and nitrogen compounds are converted, and the water become aerated increasing the content of oxygen.

In a preferred embodiment a unit according to the invention further comprises a compressor unit connected to the line for feeding air to the diffuser providing a unit only needing an external source of electrical power to be operated.

The housing of the unit may be made from materials such as metal, concrete or preferably fibre reinforced materials such as glass fibre reinforced polyester or from a plastics material for reducing the weight of the unit.

In a preferred embodiment a plastics material such as a polyolefin such as polyethylene or polypropylene or polyvinyl chloride is used.

The housing of a unit of the invention is preferably box-shaped and preferably has a square cross section seen from above. However, the unit may have other generally cylindrical shapes having circular or rectangular cross sections.

In one embodiment of the invention the bio filter is positioned in the chamber in such a manner that a fluid distribution space is formed in the chamber on top of the filter and at the least one inlet of the unit is in the form of at least one hole located at a distance from the top of the chamber walls and communicating with said space giving a simple construction.

Typically, the outlet in the side of the chamber walls has a large dimension in order to ensure a sufficiently low flow rate of water from the sludge collecting chamber to allow settling of sludge for avoiding that the sludge is carried with the treated water to the recipient. Furthermore, a large dimension of the outlet allows for using the tank of a plant according to the invention for collecting sludge minimizes the risk of clogging, and in case of a sudden high amount of incoming water and also renders it possible to run a plant without a pump for removing sludge which may simply be removed mechanically. In one embodiment of the invention the dimensions of the outlet corresponds to the size of a side of the sludge collecting chamber. This also enables a simple mechanical removal of sludge, if needed.

The sludge collecting chamber located below the bio filter in accordance with the invention reduces the risk of clogging and simplifies the running of a plant comprising the unit as stated above.

The at least one bio filter is preferably mounted in a vertical position as compared to the bottom of the housing of the unit.

It is preferred to use a bio filter which is not blocked or which does not reduce efficacy when bacteria grow thereon as would be the case when using pipes or tubing's. Suitable filter materials are e.g. tubes spun from plastic strings or filter materials available as Bioblok filter materials. In a preferred embodiment the bio filter used in the present invention is a Bioblok filter such as Bioblok 100 having a surface area of 100 $m^2/m^3$ or a Bioblok 150 having a surface area of 150 $m^2/m^3$.

The air distribution unit may be any unit from which air can be released in the form of small bubbles evenly distributed across the bottom area of the filter and is preferably a diffuser.

Typically, the diffuser delivers an amount of air of between 10 and 100 liters of air per 100 liters of vessel volume per minute.

A unit according to the invention is preferably provided with a controlling unit for controlling the rate of feeding water to the unit in a manner known per se for distributing the load on the unit evenly over a 24 hour period.

In a second aspect the invention relates to a plant for treating water, said plant comprising a first vessel for accommodating at least one unit according to the invention and further comprising a second vessel for accumulating particulate material from the water to be treated before said water is fed to the unit, said second vessel being provided an inlet for water to be treated and at least one conduit for feeding water from the second vessel to the inlet connector of the unit, at least one conduit for connected to the outlet for carrying treated water, and at least one connector for supplying power to the compressor and/or pump.

It is preferred that the inlet of a unit according to the invention is at the same level as a conduit for feeding water to the plant which eliminates the need of a pump for feeding water to the unit and renders a plant of the invention less exposed for stoppage of the function of such a plant.

A plant according to the invention may comprise from 1 to 12 units according to the invention placed in individual tanks working in series or in parallel or alternatively in a common tank.

When the units are placed in series, the partially purified waste water exiting from a first unit is passed on to a second unit and so forth giving rise to a further purification.

Less polluted water may be purified using units in parallel increasing the capacity of the plant.

Thus, a plant according to the invention may be in the form of a long and narrow plant, or a shorter but more compact plant. What are decisive for the purification capacity are the cubic capacity of the filter elements and the aeration and the interrelationship of the units as stated above.

The treated water is then discharged to the recipient via the outlet.

In a further embodiment the plant comprises from 3 to 12 units according to the invention if planned for use in connection with a minor settlement.

A plant being composed of several separate units in which each unit is separately replaceable, enables a construction, in which it is possible in a simple and easy way, to replace individual parts of the plant, or to extend the plant by adding more units, should the need arise, for example, for providing increased capacity in case of an increasing amount of water to be treated. The advantages of this are evident.

According to a particularly preferred embodiment, the plant is a small purification plant of the kind provided with a submerged aerated bio filter, such plant preferably having a capacity of treating between 10 and 150 cubic meters of water per day.

A typical volume of a unit or a section for use in connection with the preferred small plant will be between 3 $m^3$ and 40 $m^3$. The interior of the tank of a plant of the invention can, if desired, be divided into a purification portion occupied by units according to the invention and a settling portion by means of a partitioning wall which does not reach all the way to the bottom of the tank.

A plant according to the invention is preferably provided with a controlling unit for controlling the rate of feeding water to the unit in a manner known per se for distributing the load on the unit evenly over a 24 hour period, e.g. by controlling the output of a feeding pump.

In a further embodiment of the invention one or more units according to the invention may be used for providing a plant for purifying a brook, a stream, a feeder or small river. This may especially be of interest in areas in which settlements at the upper course of a brook or the like utilises the same for the discharge of waste water and settlements further downstream uses the same brook or the like as source for drinking water. It its most simple embodiment, a barrage is established and the stream of water led through one or more units according to the invention for purification of the water which units suitably may be incorporated as a part of such a barrage.

In a third aspect the invention relates to a method for treating water comprising the steps:

a) feeding the water to a unit according to the invention or a plant according to the invention at a rate distributing the load on the unit evenly over a 24 hour period and b) feeding power to the compressor for feeding air to the air distribution unit.

In a preferred embodiment, the control of the process is constructed and controlled in such manner that the day load on the plant is distributed evenly over all the 24 hours of the day.

By controlling the flow of polluted water through the plant over the time, the polluted water can be passed through the plant evenly distributed over the entire day and hereby provide optimal living conditions for the micro organisms. Optimal bacteria growth conditions result in a more efficient purification, which again gives a reduction of the overcapacity which would else be necessary.

It has surprisingly and unexpectedly been found that by the method according to the invention in which the a time wise proportional load on the plant, outlet analysis results are obtained that are significantly below the requirements which the authorities place on far larger and much more advanced systems.

It is preferred to ensure an even load of the plant by using an electronically controlled pump for controlling the stream of water to the unit or plant.

In an especially preferred embodiment the water flows though the biodegrading zone at such a rate that settlement occurs in the biodegrading zone. A suitable rate can be determined by first determining the averaged settle rate of the particles in the water and then adjusting the flow rate such that the water remains in the zone longer than it takes for an average particle to sink from the top of the zone to the bottom. The settlement can settle any desired fraction of the particles by adjusting the flow rate of water to settle rate for the desire fraction. However the necessary feed to the bacteria also has to be taken into account.

DESCRIPTION OF THE PREFERRED EMBODIMENTS

The invention is now explained more in detail with reference to the drawings showing preferred embodiments of the invention.

Figure 1:
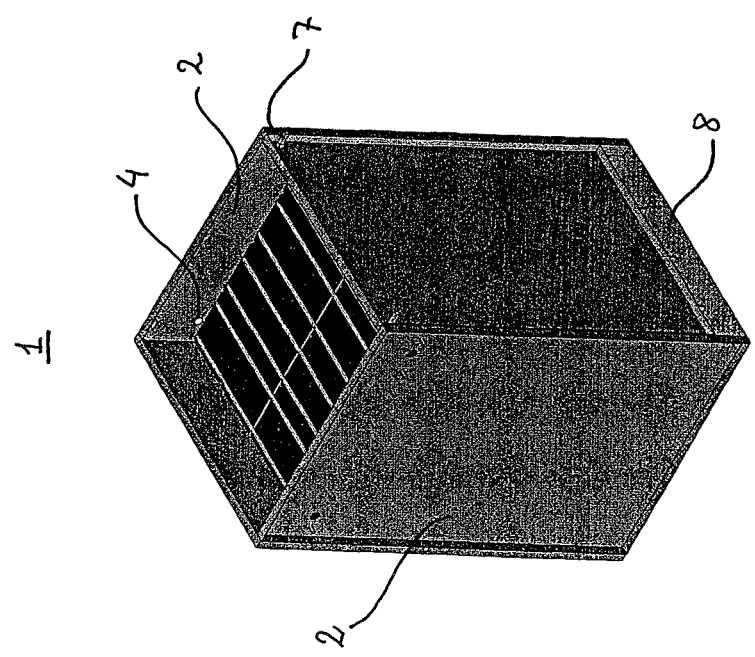
FIG. 1 shows an embodiment of a unit of the invention seen at an angle from above
Figure 2:
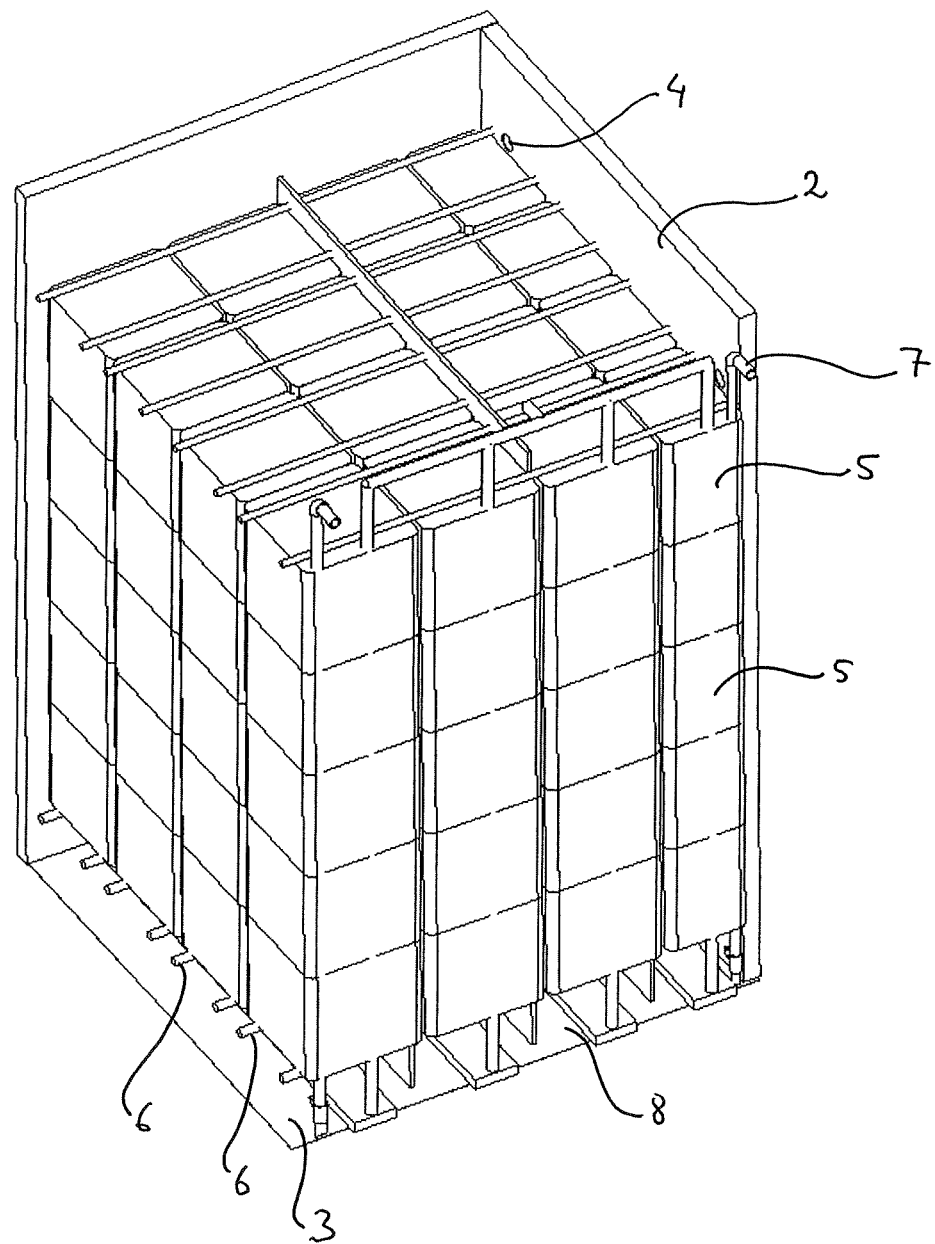
FIG. 2 shows the embodiment of FIG. 1 in which two walls of the housing have been taken away.

Reference is made to FIGS. 1 and 2 of the drawings showing an embodiment of a unit according to the invention.

A unit 1 for water treatment comprises
a) a housing having walls 2 and a bottom 3 defining a chamber optionally having a top cover, said chamber being provided with at least one inlet 4,
b) at least one bio filter 5 placed in said chamber,
c) at least one air distribution unit 6 placed in said chamber between said bio filter 5 and the bottom 3 of the chamber and being provided with a line 7 for feeding air to the diffuser, and
d) at least one inlet 4,
e) at least one outlet 8.

Furthermore such a unit is provided with at least one connection for a line for feeding compressed air to the air distribution unit, and at least one connection for connecting to an external supply of electrical power.

FIG. 3 shows the unit shown in FIG. 1 seen from above.

A unit or a plant according to the invention may be made in a manner known per se by the skilled in the art after deciding on the materials to be used for a specific embodiment of the invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

SUMMARY LISTING OF REFERENCES

WO 03/020650 A1 (Kongsted Maskinfabrik) 13 Mar. 2003
US 2004/0173524 A1 (Kongsted Maskinfabrik) 9 Sep. 2004
WO 2005/026064 A1 (Biokube) 24 Mar. 2005
US 2007/0108124 A1 (Biokube) 17 May 2007
WO 98/23540 A1 (Ferdinand Joergen Marcus) 4 Jun. 1998
U.S. Pat. No. 6,217,761 B1 (Catanzaro et al.) 17 Apr. 2001
GB 2355712 A (Mate Stehpen Ferenc et al.) 2 May 2001
DE 19945985 A1 (Ammermann GmbH) 29 Mar. 2001
WO 03/027030 A1 (Hepworth Building Products Limited) 3 Apr. 2003
U.S. Pat. No. 5,707,513 A (Jowett E Craig at al.) 13 Jan. 1998
US 2003/0132148 A1 (Okamoto Ryoichi et al.) 17 Jul. 2003
EP 1 484 287 A (University of Santiago Compostella) 8 Dec. 2004

What is claimed is:

1. A unit having all functional parts necessary for performing a water treatment, said unit comprising:
   a) a housing having walls and a level bottom defining a box-shaped chamber, said chamber including at least one inlet for water to be treated and at least one outlet for treated water, said outlet being in a lower part of side walls of the chamber;
   b) at least one bio filter placed in said chamber, said bio filter having a height that is shorter than a height of the side walls of the chamber and being positioned in the chamber such that a sludge collecting chamber having a same cross section as the chamber is provided in the chamber below the bio filter;
   c) at least one air distribution unit placed in said chamber between said bio filter and a bottom of the chamber, said air distribution unit being located so that all air is released below the bio filter;
   d) at least one connection for connecting the inlet with an inlet conduit; and
   e) at least one connection for a line for feeding compressed air to the air distribution unit,
   said at least one outlet for treated water having dimensions corresponding to a size of a side of the sludge collecting chamber.

2. The unit as claimed in claim 1, wherein the box-shaped chamber has a square cross section in plan view.

3. The unit as claimed in claim 1, further comprising a compressor unit connected to the line for feeding compressed air to the air distribution unit.

4. The unit according to claim 3, wherein the compressor unit is connected to a line for feeding the compressed air to an air lift pump.

5. The unit as claimed in claim 1, wherein the housing has a material of construction that is a plastic material.

6. The unit as claimed in claim 1, wherein the at least one inlet is configured as holes located a distance from a top of the chamber walls.

7. The unit as claimed in claim 1, wherein the at least one bio filter is mounted in a vertical position relative to the bottom of the chamber.

8. The unit as claimed in claim 1, wherein the air distribution unit is a diffuser.

9. A plant for treating water, said plant comprising:
   a first vessel for accommodating at least one unit according to claim 1; and
   a second vessel for accumulating particulate material from the water to be treated before said water is fed to the unit, said second vessel including an inlet for the water to be treated and at least one conduit for feeding the water from the second vessel to the inlet connection of the unit, at least one conduit for connection to the outlet for carrying the treated water, and at least one connector for supplying power to the unit.

10. The plant according to claim 9, wherein the unit has a capacity of treating between 10 and 150 cubic meters of water per day.

11. A plant for treating water, said plant comprising:
a first vessel for accommodating at least one unit according to claim 1, wherein the inlet of the unit is at a same level as the inlet of the conduit for feeding the water to the plant.

12. The unit according to claim 1, wherein the housing has a material of construction that is polyethylene, polypropylene, or polyvinyl chloride.

13. The unit according to claim 1, wherein the bio filter includes pipes or tubing.

14. The unit according to claim 1, wherein the box-shaped chamber includes a top cover.

15. A method for treating water comprising the following steps:
a) feeding the water to a unit having all functional parts necessary for performing the water treatment, said unit including a housing having walls and a level bottom defining a box-shaped chamber, said chamber including at least one inlet for water to be treated and at least one outlet for treated water, said outlet being in a lower part of side walls of the chamber,
at least one bio filter placed in said chamber, said bio filter having a height that is shorter than a height of the side walls of the chamber and being positioned in the chamber such that a sludge collecting chamber having a same cross section as the chamber is provided in the chamber below the bio filter,
at least one air distribution unit placed in said chamber between said bio filter and a bottom of the chamber, said air distribution unit being located so that all air is released below the bio filter,
at least one connection for connecting the inlet with an inlet conduit, and
at least one connection for a line for feeding compressed air to the air distribution unit,
said at least one outlet for treated water having dimensions corresponding to a size of a side of the sludge collecting chamber,
said step of feeding the water including feeding the water at a rate that distributes a load on the unit evenly over a 24 hour period; and
b) feeding power to a compressor for feeding the air to the air distribution unit.

16. A method for treating water comprising the following steps:
a) feeding the water to a plant that includes
a first vessel for accommodating at least one unit having all functional parts necessary for performing the water treatment, said unit including
a housing having walls and a level bottom defining a box-shaped chamber, said chamber including at least one inlet for water to be treated and at least one outlet for treated water, said outlet being in a lower part of side walls of the chamber,
at least one bio filter placed in said chamber, said bio filter having a height that is shorter than a height of the side walls of the chamber and being positioned in the chamber such that a sludge collecting chamber having a same cross section as the chamber is provided in the chamber below the bio filter,
at least one air distribution unit placed in said chamber between said bio filter and a bottom of the chamber, said air distribution unit being located so that all air is released below the bio filter,
at least one connection for connecting the inlet with an inlet conduit, and
at least one connection for a line for feeding compressed air to the air distribution unit,
said at least one outlet for treated water having dimensions corresponding to a size of a side of the sludge collecting chamber,
a second vessel for accumulating particulate material from the water to be treated before said water is fed to the unit, said second vessel including an inlet for the water to be treated and at least one conduit for feeding the water from the second vessel to the inlet connection of the unit,
at least one conduit for connection to the outlet for carrying the treated water, and at least one connector for supplying power to the unit
said step of feeding the water including feeding the water at a rate that distributes a load on the unit evenly over a 24 hour period and
b) feeding power to a compressor for feeding the air to the air distribution unit.

\* \* \* \* \*